United States Patent [19]

Spencer

[11] Patent Number: 4,496,790
[45] Date of Patent: Jan. 29, 1985

[54] SELF-ANCHORING POKE-THRU WIRING DEVICE

[75] Inventor: David E. Spencer, Oxford, Ohio

[73] Assignee: Square D Company, Palatine, Ill.

[21] Appl. No.: 476,740

[22] Filed: Mar. 18, 1983

[51] Int. Cl.³ .............................................. H02G 3/22
[52] U.S. Cl. ...................................... 174/48; 52/221; 411/523
[58] Field of Search ...................... 174/48, 49; 52/221; 248/216.4; 411/516, 520–524

[56] References Cited

U.S. PATENT DOCUMENTS

| 3,803,341 | 4/1974 | Klinkman et al. | 174/48 |
| 4,264,779 | 4/1981 | Rhodes et al. | 174/48 |
| 4,272,643 | 6/1981 | Carroll et al. | 174/48 |
| 4,323,724 | 4/1982 | Shine | 174/48 |

Primary Examiner—A. T. Grimley
Assistant Examiner—D. A. Tone
Attorney, Agent, or Firm—Larry I. Golden; Richard T. Guttman

[57] ABSTRACT

A self-anchoring poke-thru wiring device for the extension of communication and/or electrical wiring through a passage in a floor designed to prevent the spread of fire from one side of the floor to the other and facilitate ready installation and removal of the device from above the floor opening. The device includes a pair of upper conduit portions aligned with a pair of lower conduit portions and a plurality of fire resistant expandable disks retained between an upper and a lower plate intermediate the pairs of conduit portions, the disks and plates including aligned apertures with the conduit portions providing separate wireway channels. The upper conduit portions lead into an outlet box via a floor plate. A pair of generally V-shaped resilient retaining members are removably secured to opposite sides of the upper plate. Each retaining member includes a base leg which is removably secured by a screw to the upper plate and a retaining leg which includes a generally V-shaped notch providing a pair of barbs at the distal end of each leg which extend radially outward past the periphery of the upper and lower plates a sufficient distance to retain the assembly within a floor opening upon insertion. The floor plate of the outlet box includes a plurality of openings aligned with the notches and retaining screws to permit release of the retaining members from above the floor through the floor plate facilitating ready removal of the device from above the floor.

12 Claims, 4 Drawing Figures

SELF-ANCHORING POKE-THRU WIRING DEVICE

BACKGROUND OF THE INVENTION

1. Field of the Invention

This invention relates in general to poke-thru wiring devices and, more particularly, to an improved and more economical self-anchoring poke-thru wiring device.

2. Summary of the Prior Art

Various means have been employed for securing poke-thru wiring devices within a floor opening. One such device is described in U.S. Pat. No. 4,272,643, issued on June 9, 1981 in the name of Carroll et al and assigned to the same assignee as the instant application. Other assemblies are shown in U.S. Pat. Nos. 4,323,724 and 4,264,779.

The '643 fitting is retained within the floor opening by compressing fire resistant disks between two plates and thereby expanding the disks against the perimeter of the concrete floor opening to retain the device therein. Such device is therefore not self-anchoring as those disclosed in the '724 and '779 patents. Although the latter two devices are self-anchoring, they do not provide many of the advantages that are provided by the instant invention.

SUMMARY OF THE PRESENT INVENTION

The present invention incorporates a pair of spring steel retaining wedges, each having two corners which wedge into the side of a floor opening in which the fitting is to be retained. The retaining wedge is formed to a generally V-shape and includes a base leg and a retaining leg. The retaining leg is provided with a generally U or V-shaped notch forming two barbs at the distal end of the retaining leg, while the base leg is provided with an aperture through which a screw extends to secure the wedge to a top plate of the fitting which is dimensioned to be received within the floor opening. The notch is aligned with the aperture to provide access to the screw from above, facilitating removal of the assembly from its location within a floor opening from above the floor.

It is, therefore, one object of the present invention to provide a simple and more economical self-anchoring fitting assembly for extending wiring through a floor.

It is another object of the present invention to facilitate ready removal of the self-anchoring flooring assembly from the floor opening in either direction.

Other objects and features of the present invention will become apparent from the following description and claims, together with the drawings.

DESCRIPTION OF THE PREFERRED EMBODIMENT

Figure 1:
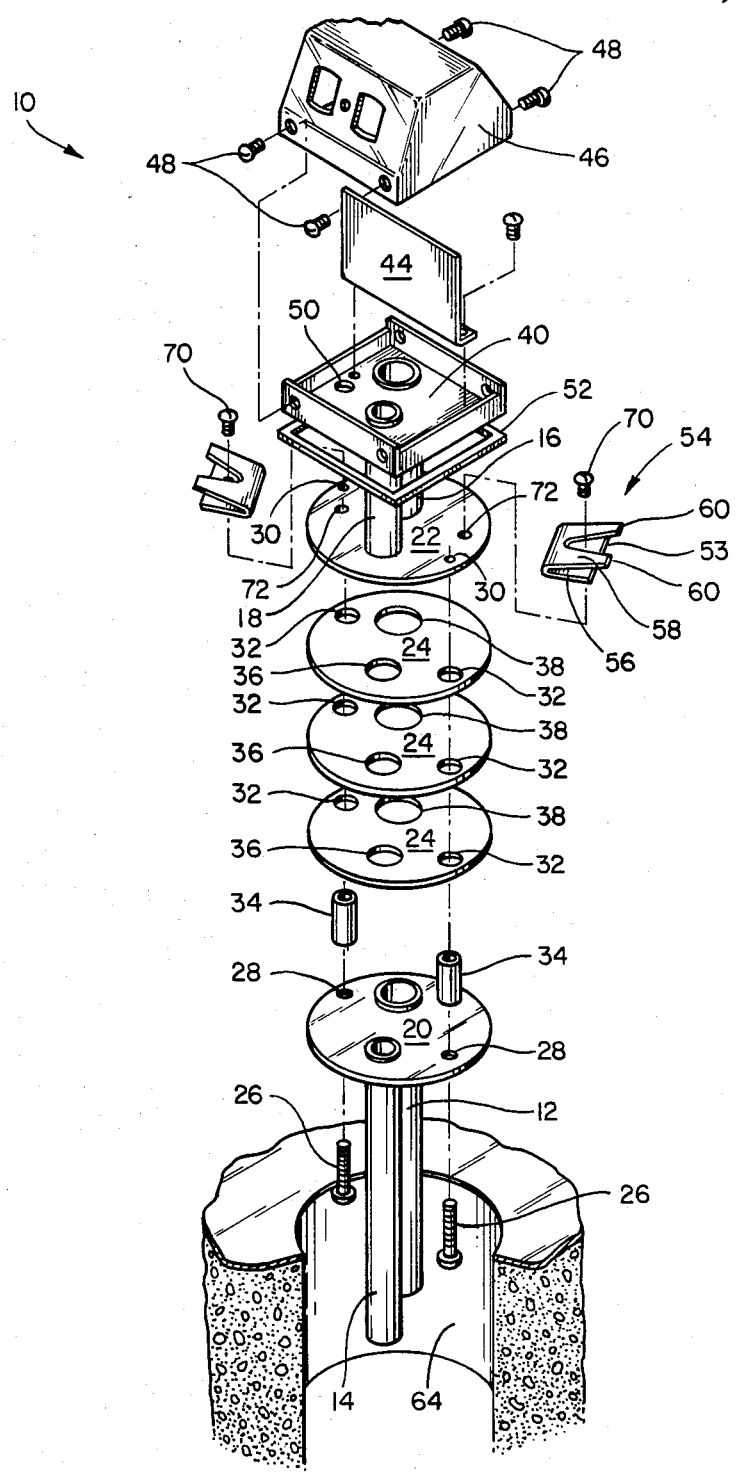
FIG. 1 is an exploded view of the self-anchoring poke-thru wiring device incorporating the principles of the present invention.
Figure 2:
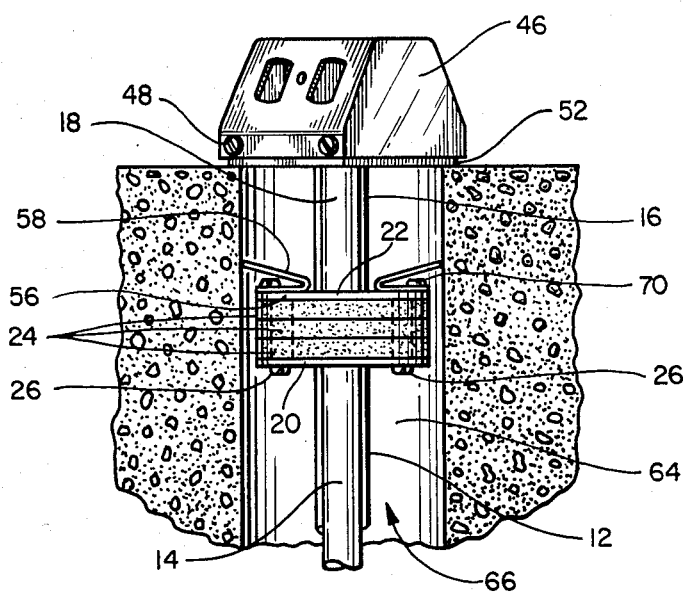
FIG. 2 is a side view of the fitting assembly shown in FIG. 1 secured within a floor opening.
Figure 3:
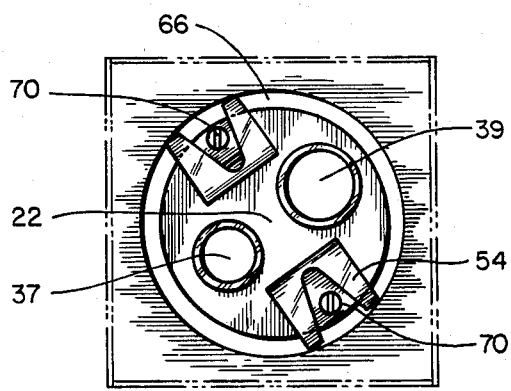
FIG. 3 is taken along lines 3—3 of FIG. 2 and shows the retaining wedges from a top view.
Figure 4:
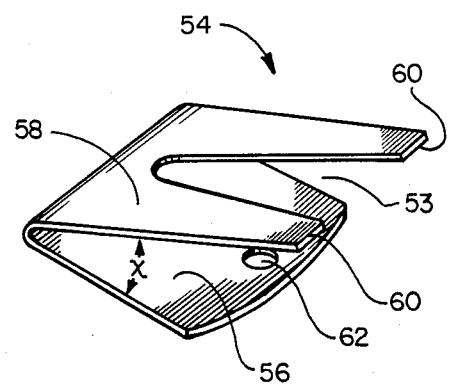
FIG. 4 depicts the retaining wedge in perspective view.

Referring to FIG. 1 of the Drawings, a fire resistant poke-thru fitting is indicated generally by reference character 10. The fitting is substantially as shown and described in the aforementioned U.S. Pat. No. 4,272,643 which is incorporated by reference herein. It includes pairs of longitudinally aligned conduit sections identified as 12, 14, 16 and 18. The first pair 12 and 14 are secured in a bottom plate 20 by a rollover crimp while a second pair, 16 and 18 are similarly secured in a top plate 22. The plates 20 and 22 are circular in shape to conform to the shape of the floor opening, although such conformity is not a necessary feature to practice the invention. The periphery of the plates need only be dimensioned to be received within the floor opening.

Three disks 24 of expandable fire resistant material are sandwiched between plates 20 and 22. One suitable type of expandable fire resistant material is sold by the 3M Company of St. Paul, Minn. under the name of "3M FIRE STOP MATERIAL", #FS-195.

Plates 20 and 22 are connected by screws 26 which are inserted through apertures 28 in bottom plate 20 and are received by threaded apertures 30 in top plate 22. Openings 32 are provided in disks 24 through which screws 26 pass between plates 20 and 22. A sleeve 34 is provided between plates 20 and 22 through which the stem of screws 26 pass. The sleeve also extends through openings 32, providing a barrier between the screw 26 and the disk material 24 while serving also to maintain a minimum separation between plates 20 and 22 equal to the length of the sleeve.

Each disk material includes a pair of apertures 36 and 38 respectively in registration with the passageways defined by the pairs of conduit. Aperture 36 is aligned between and in registration with conduit sections 14 and 18 while aperture 38 is similarly associated with conduits 12 and 16. Channels 37 and 39 are thereby provided by the conduits and aligned apertures of the disk material to facilitate the extension of wiring through a floor opening.

The ends of conduits 16 and 18 opposite plate 22 are secured by a rollover crimp to a floor plate 40, which forms the lower wall of an outlet box 42. A barrier wall 44 is connected to floor plate 40 to provide separate compartments within the outlet box when a shell 46 is placed over floor plate 40 and connected thereto with screws 48 or through the use of other fastening means. Channels 37 and 39 thereby lead to separate compartments within the outlet box, maintaining separation between, for example, communication and power wiring extending through the respective channels. Openings 50 are also provided in floor plate 40 for reasons which will hereinafter be discussed. A rubber gasket 52 is generally provided between the floor plate and the floor covering.

Secured to plate 22 are a pair of generally V-shaped spring members 54 comprising a base leg 56 and a retaining leg 58 having a generally U or V-shaped notch or indentation 53 forming a pair of barbs 60 at the distal end of the retaining leg. The interior angle X formed by the retaining leg and the base leg is approximately 15°. It is necessary that the retaining leg be sufficiently longer then the base leg so as to extend peripherally outward past the perimeter of plate 22 to engage the wall portion 64 of opening 66 in concrete floor 68 to retain the device therein.

The retaining member which is formed of 0.03 inch spring steel hardened to 41-45 Rockwell "C" is releasably secured to top plate 22 by screw 70 which is received by a threaded aperture 72 of plate 22.

The barbs 60 wedge against the side walls of floor opening 66 upon insertion of the device to its intended position. The resilient, peripherally extending portions of the retaining legs facilitate the secure fit of the device notwithstanding a slightly oversized hole. Once the fitting is secured into position, the barbs 60 on each of the retaining members serve to prevent rotation of the fitting about its longitudinal axis.

Openings 50 in floor plate 40 are respectively aligned with the indentations 53 on each of the retaining members, which in turn are respectively aligned with apertures 62, providing access to screws 70 through the floor plate from above. To remove the fitting, screws 70 can be easily removed from threaded apertures 62 with a screwdriver from above the floor opening, thereby releasing the grip of wedge members 54, facilitating ready removal of the fitting out the top or bottom of the floor opening.

The retaining members 54 are, of course, fastened to plate 22 by screws 70 prior to installation of the device within a floor opening. Upon insertion, the barbs 60 of retaining legs 58 are urged upward, providing resilient pressure between the retaining leg and the wall of the floor opening to secure the fitting therein. The squared-off outer corners of barbs 60 prevent rotational movement of the fitting within the floor opening. The generally U or V-shaped notch in retaining member 54 defines an obtuse inner angle on the pair of retaining barbs at the end of leg 58 while also providing access to screw 70 to facilitate ready removal of the insert device from above the floor opening as previously described.

Although it has been shown and described what is considered to be a preferred embodiment of the invention, modifications thereto will readily occur to those skilled in the art. The invention is not to be understood as limited to the embodiment shown and described herein, and it is intended to cover in the appended claims all such modifications as fall within the true spirit and scope of the invention.

What is claimed is:

1. A self retaining wiring device for placement in a floor passage comprising:
    an outlet box including a floor plate;
    a wiring channel having one end disposed in said floor plate to facilitate extension of wire through said channel and into said outlet box and having an opposite end adapted to be received in a junction box;
    sealing means for sealing said channel intermediate its opposite ends in response to a fire for preventing the spread of said fire through said floor passage;
    a second plate surrounding said channel and associated in parallel planar relationship to said floor plate, said second plate having a periphery dimensioned to be received within said floor passage;
    a plurality of generally V-shaped resilient members removably secured to said second plate, each resilient member having a base leg and a retaining leg;
    securing means for removably securing said base leg to said second plate;
    said retaining leg extending peripherally outward past the periphery of said second plate and having portions defining a notch providing a pair of barbs at its distal end.

2. A wiring device as claimed in claim 1 wherein said retaining leg and said base leg form an angle therebetween of approximately 15°.

3. A wiring device as claimed in claim 1 wherein said retaining member is formed of 0.03 inch spring steel.

4. A wiring device as claimed in claim 1 wherein said securing means comprises a threaded aperture in said second plate, an aperture in said base leg and a screw extending through said aperture in said base leg and threadingly received by said aperture of said second plate.

5. A wiring device as claimed in claim 4 wherein said notch is provided directly above said screw whereby access is provided to said screw from above said floor opening.

6. A wiring device as claimed in claim 5 wherein said floor plate includes an aperture in registration with said notch and screw head facilitating removal of said screw while said floor plate remains in place.

7. A self retaining wiring device for placement in a floor passage comprising:
    an outlet box including a floor plate;
    a first conduit portion having one end received in said floor plate;
    a first sandwich plate having an aperture receiving said opposite end of said first conduit portion said first plate dimensioned to be received within said floor passage;
    a second sandwich plate connected to said first sandwich plate and dimensioned to be received within said floor passage;
    a fire retardent disk material intermediate said first and second sandwich plates having an aperture aligned with said first conduit portion;
    a second conduit portion received in said second sandwich plate aligned in registration with said first conduit portion and having an opposite end adapted to be connected to a junction box;
    a plurality of generally V-shaped resilient members removably secured to said first sandwich plate, each resilient member having a base leg and a retaining leg;
    said retaining leg extending peripherally outward past the periphery of said second plate and having portions defining a notch providing a pair of barbs at its distal end.

8. A wiring device as claimed in claim 7 wherein said first sandwich plate includes a plurality of threaded apertures, each base leg includes an aperture, and a screw extending through said aperture in each base leg threadingly received by a respective aperture of said first sandwich plate.

9. A wiring device as claimed in claim 8 wherein said floor plate includes a plurality of apertures respectively in registration with said notch and said screw to facilitate removal of said screw without removing said outlet box.

10. A wiring device as claimed in claim 8 including a plurality of sleeve members intermediate said first sandwich plate and said second sandwich plate and a screw extending through each said sleeve member connecting said plates.

11. A wiring device as claimed in claim 10 wherein said retaining member is formed of 0.03 inch spring steel and said retaining leg and base leg form an angle therebetween of approximately 15°.

12. A wiring device as claimed in claim 11 wherein each barb has an outer corner formed at approximately a 90° angle and an inner corner having an obtuse angle defined by said notch.

* * * * *